United States Patent
Zhang et al.

(10) Patent No.: US 8,792,500 B2
(45) Date of Patent: *Jul. 29, 2014

(54) MULTIUSER SCHEDULING FOR MIMO BROADCAST CHANNELS WITH FINITE RATE FEEDBACK

(75) Inventors: Wei Zhang, Hong Kong (CN); Khaled Ben Letaief, Hong Kong (CN)

(73) Assignee: Yim Tu Investments Ltd., LLC, Wilmington, DE (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/240,219

(22) Filed: Sep. 22, 2011

(65) Prior Publication Data

US 2012/0008583 A1 Jan. 12, 2012

Related U.S. Application Data

(63) Continuation of application No. 12/108,485, filed on Apr. 23, 2008, now Pat. No. 8,054,837.

(60) Provisional application No. 60/914,810, filed on Apr. 30, 2007.

(51) Int. Cl.
*H04L 12/28* (2006.01)

(52) U.S. Cl.
USPC ........ 370/395.4; 370/310; 370/328; 370/329; 370/431; 370/462

(58) Field of Classification Search
USPC .......................................... 370/395.4–395.43
See application file for complete search history.

(56) References Cited

U.S. PATENT DOCUMENTS

| | | | |
|---|---|---|---|
| 5,634,203 | A | 5/1997 | Ghaem |
| 5,940,379 | A | 8/1999 | Startup et al. |

(Continued)

FOREIGN PATENT DOCUMENTS

| | | |
|---|---|---|
| EP | 1914909 | 4/2008 |
| KR | 1020060123283 | 12/2006 |
| WO | 2005060123 A1 | 6/2005 |

OTHER PUBLICATIONS

Knopp, et al., "Information capacity and power control in single cell multiuser communications," in Proc. IEEE ICC, Jun. 1995, pp. 331-335. 0-7803-2486-2/95 IEEE 1995. http://www.eurecom.fr/util/publidownload.fr.htm?id=581. Last accessed May 29, 2008, 5 pages.

(Continued)

*Primary Examiner* — Hassan Kizou
*Assistant Examiner* — Ashil Farahmand
(74) *Attorney, Agent, or Firm* — Amin, Turocy & Watson, LLP

(57) ABSTRACT

System and methodologies are provided herein for multiuser scheduling in a multiple-input multiple-output (MIMO) communication system. Various aspects described herein facilitate full feedback scheduling, wherein multiuser scheduling is performed based on an antenna selection and signal quality feedback, such as signal-to-interference-plus-noise ratio (SINR) feedback, from respective users. Based on information received from respective users, independent information streams can be transmitted from respective transmit antennas to respective users with the highest signal quality. Receive antenna selection can also be employed to allow respective users to select a single receive antenna on which information is to be received. Additional aspects described herein facilitate quantized feedback scheduling, wherein scheduling is performed based on signal quality feedback that is quantized into a finite number of bits by respective users.

20 Claims, 10 Drawing Sheets

(56) References Cited

U.S. PATENT DOCUMENTS

| | | | |
|---|---|---|---|
| 6,300,890 | B1 | 10/2001 | Okuda et al. |
| 8,054,837 | B2* | 11/2011 | Zhang et al. ............... 370/395.4 |
| 2003/0087673 | A1 | 5/2003 | Walton et al. |
| 2003/0161338 | A1 | 8/2003 | Ng et al. |
| 2005/0064872 | A1 | 3/2005 | Osseiran et al. |
| 2005/0157807 | A1 | 7/2005 | Shim et al. |
| 2005/0181739 | A1 | 8/2005 | Krasny et al. |
| 2006/0146755 | A1 | 7/2006 | Pan et al. |
| 2006/0209980 | A1 | 9/2006 | Kim et al. |
| 2006/0276217 | A1 | 12/2006 | Khojastepour et al. |
| 2006/0276229 | A1 | 12/2006 | Braun et al. |
| 2007/0191066 | A1 | 8/2007 | Khojastepour et al. |
| 2007/0223582 | A1 | 9/2007 | Borer |
| 2008/0056414 | A1 | 3/2008 | Kim et al. |
| 2008/0132281 | A1 | 6/2008 | Kim et al. |

OTHER PUBLICATIONS

Hochwald, et al., "Multiple-antenna channel hardening and its implications for rate feedback and scheduling." IEEE Trans. Inf. Theory, vol. 50, No. 9, pp. 1893-1909, Sep. 2004. Digital Object Identifier 10.1109/TIT.2004.833345. http://ieeexplore.ieee.org/iel5/18/29368/01327795.pdf?tp=isnumber=&arnumber=1327795. Last accessed May 28, 2008, 4 pages.

Gozali, et al., "The impact of multiuser diversity on space-time block coding," IEEE Commun. Left., vol. 7, pp. 213-215, May 2003. Digital Object Identifier 10.1109/LCOMM.2003.812182. http://ieeexplore.ieee.org/iel5/4234/27023/01200184.pdf?tp=&amumber=1200184&isnumber=27023. Last accessed May 28, 2008, 3 pages.

Viswanath, et al., "Opportunistic beamforming using dumb antennas," IEEE Trans. Inf. Theory, vol. 48, pp. 1277-1294, Jun. 2002. Publisher Item Identifier S 0018-9448(02)04009-9. http://www.eecs.berkeley.edu/"dtse/oppbef_it.pdf. Last accessed May 28, 2008, 18 pages.

Larsson, "On the combination of spatial diversity and multiuser diversity," IEEE Commun. Left., vol. 8, pp. 517-519, Aug. 2004. Digital Object Identifier 10.1109/LCOMM.2004.833808. http://ieeexplore.iee.org/iel5/4234/29321/01324678.pdf?tp=&arnumber=132467&isnumber=29321. Last accessed May 28, 2008, 3 pages.

Jindal, et al., "Dirty-paper coding versus TDMA for MIMO broadcast channels," IEEE Trans. Inf. Theory, vol. 51, pp. 1783-1794, May 2005. Digital Object Identifier: 10.1109/TIT.2005.846425. Posted online: Apr. 25, 2005. http://ieeexplore.ieee.org/iel5/18/30754/01424315.pdf?tp=arnumber=1424315&isnumber=30754. Last accessed May 28, 2008, 12 pages.

Caire, et al., "On the achievable throughput of a multiantenna Gaussian broadcast channel," IEEE Trans. Inf. Theory, vol. 49, pp. 1691-1706, Jul. 2003. Digital Object Identifier 10.1109/TIT.2003.813523. http://ieeexplore.ieee. org/iel5/18/27176/01207369.pdf?tp=&arnumber=1207369&isnumber=27176. Last accessed May 28, 2008, 16 pages.

Tu, et al., "Multiuser diversity for a dirty paper approach." IEEE Trans. Commun. Left., vol. 7, pp. 370-372, Aug. 2003. http://ieeexplore.ieee.org/iel5/4234/27419/01220272.pdf?tp=&arnumber=1220272&isnumber=27419. Last accessed May 28, 2008, 3 pages.

Yoo, et al., "On the optimality of multiantenna broadcast scheduling using zero-forcing beamforming," IEEE J. Select. Areas Commun., vol. 24, pp. 528-541, Mar. 2006. Digital Object Identifier 10.1109/JSAC.2005.862421. http://ieeexplore.ieee.org/iel5/49/33698/01603708.pdf?tp=&arnumber=1603708&isnumber=33698. Last accessed May 28, 2008, 14 pages.

Jindal, "MIMO broadcast channels with finite rate feedback," in Proc. IEEE GLOBECOM, St. Louis, USA, Nov. 28-Dec. 2, 2005, vol. 3, pp. 1520-1524. Digital Object Identifier 10.1109/GLOCOM.2005.1577905. IEEE Globecom 2005. http://ieeexplore.ieee.org/iel/10511/33287/01577905.pdf?tp=arnumber=1577905&isnumber=33287.

Sharif, et al., "On the Capacity of MIMO Broadcast Channels with Partial Side Information." IEEE Trans. Inf. Theory, vol. 51, No. 2, pp. 506-522, Feb. 2005. Digital Object Identifier 10.1109/TIT.2004.840897. http://ieeexplore.ieee.org/iel5/18/30183/01386524.pdf?tp=arnumber=1386524&isnumber=30183. Last accessed May 28, 2008, 17 pages.

Floren, et al., "The Effect of Feedback Quantization on the Throughput of a Multiuser Diversity Scheme." in Proc. IEEE, GLOBECOM, 2003, pp. 497-501. 0-7803-7974-8/03 IEEE. Http://ieeexplore.ieee.org/iel5/8900/28132/01258287.pdf?tp=tp=&arnuber=1258287&isnumber=28132. Last accessed May 28, 2008, 5 pages.

Sanayei, et al., "Exploiting multiuser diversity with only 1-bit feedback," in Proc. IEEE WCNC, Apr. 2005, pp. 978-983. IEEE Communications Society / WCNC 2005, 0-7803-8966-2/05. http://ieeexplore.ieee.org/iel5/9744/30729/01424641.pdf?tp=&arnumber=1424641&isnumber=30729. Last accessed May 28, 2008, 6 pages.

Lee, et al., Analysis on the Impact of Multi-Element Transmit Antenna System on Multiuser Diversity, in Proc. IEEE VTC, Sep. 2004, pp. 329-333. 0-7803-8521-7/04 IEEE. http://ieeexplore.ieee.org/iel5/9623/30410/01400013.pdf?tp=&arnumber=1400013&isnumber=30410. Last accessed May 28, 2008, 5 pages.

Kountouris, et al., "Multiuser Diversity-Multiplexing Tradeoff in MIMO Broadcast Channels with Limited Feedback," ACSSC '06, Fortieth Asilomar Conference on Signals, Systems and Computers 2006, Nov. 1, 2006, pp. 364-368 (numbered pp. 1-5).

Bhashyam, et al., "Feedback gain in multiple antenna systems," IEEE Transactions on vol. 50, Issue 5, May 2002, pp. 785-798.

International Search Report & Written Opinion dated Mar. 20, 2009 for PCT Application Serial No. PCT/IB2008/003485, 18 pages.

OA dated Feb. 18, 2011 for U.S. Appl. No. 12/108,485, 26 pages.

* cited by examiner

MULTIUSER SCHEDULING FOR MIMO BROADCAST CHANNELS WITH FINITE RATE FEEDBACK

CROSS-REFERENCE

This application is a continuation of U.S. patent application Ser. No. 12/108,485, filed on Apr. 23, 2008, entitled "MULTIUSER SCHEDULING FOR MIMO BROADCAST CHANNELS WITH FINITE RATE FEEDBACK", which claims the benefit of U.S. Provisional Patent Application Ser. No. 60/914,810, filed on Apr. 30, 2007, entitled "MULTIUSER SCHEDULING FOR MIMO BROADCAST CHANNELS WITH FINITE RATE FEEDBACK", the entireties of which are herein incorporated by reference.

TECHNICAL FIELD

The present disclosure relates generally to wireless communications systems, and more particularly to techniques for multi-user scheduling in a wireless communication system.

BACKGROUND

Multiuser diversity is a form of selection diversity among users in a wireless communication system that arises from independent fading channels between a base station and multiple users. A variety of multiuser scheduling algorithms have been proposed that take advantage of multiuser diversity for downlink transmissions in multiple-input multiple-output (MIMO) systems. Most of these existing approaches are based on time division multiple access (TDMA). However, due at least in part to the fact that a base station using TDMA can transmit to only one user at a time, the maximum sum-rate achievable by such approaches for MIMO broadcast channels is only a small fraction of the total sum-rate capacity of MIMO broadcast channels.

Other existing scheduling algorithms, such as dirty paper coding (DPC), can achieve MIMO broadcast channel capacity by serving multiple users simultaneously. However, achieving an optimum transmission policy using a scheduling algorithm such as DPC is computationally complex. Further, while low-complexity DPC algorithms have been proposed, such algorithms require perfect knowledge of channel state information (CSI) at the transmitter. However, perfect knowledge of CSI at the transmitter is generally impossible to obtain in practice due to system limitations. Instead, a limited CSI feedback load is generally provided to a base station from users at a finite rate. As the available feedback load of a system decreases, traditional multiuser scheduling algorithms experience a significant reduction of throughput and/or a significant increase in complexity. Accordingly, there exists a need for a low-complexity, high-throughput scheduling algorithm for MIMO broadcast channels with finite rate feedback.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The following disclosure provides systems and methodologies for multiuser scheduling in a MIMO communication system. In accordance with various aspects described herein, full feedback scheduling is provided, wherein multiuser scheduling is accomplished via a MIMO broadcast scheduling algorithm that utilizes signal quality feedback from all users. In one example, a base station in a wireless communication system can receive an antenna selection and signal quality feedback, such as SINR feedback, from each user in the system. Based on this information, the base station can transmit independent information streams from respective transmit antennas at the base station to respective users with the highest signal quality. In another example, receive antenna selection can be employed to allow respective users to select a single receive antenna on which information is to be received from the base station. Accordingly, optimal multiuser scheduling can be achieved for a MIMO communications system while requiring less complexity and power than traditional multiuser scheduling approaches, such as those that employ every receive antenna in the system as a virtual user.

Other aspects described herein provide quantized feedback scheduling, wherein signal quality feedback, such as SINR feedback, is quantized into a finite number of bits by respective users and sent back as feedback to a base station. Such an approach can be used, for example, in a MIMO communications system with finite rate CSI feedback. In one example, the achievable sum-rate throughput of a MIMO communications system increases as the number of users increases by using quantized feedback scheduling as described herein, even in cases where only 1 bit is allotted for quantized CSI feedback.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

DETAILED DESCRIPTION

Figure 1:
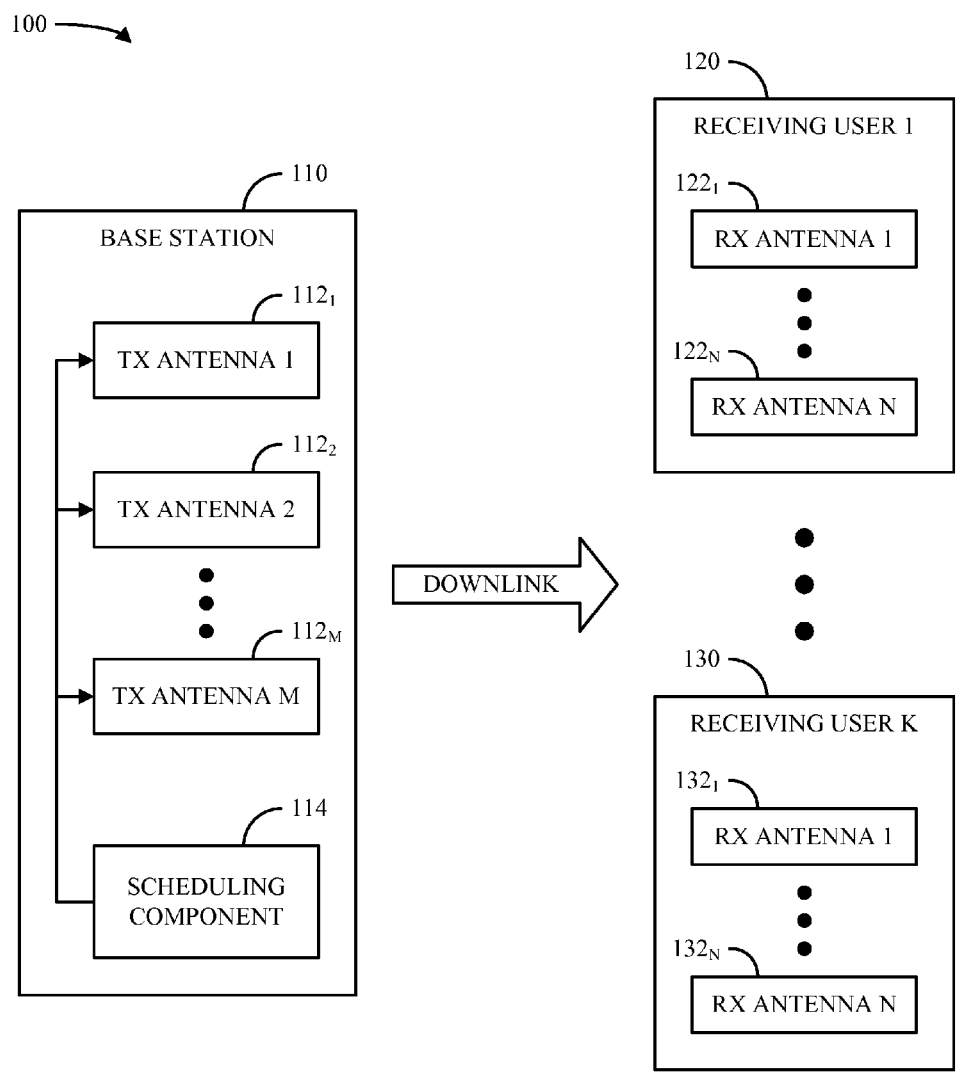
FIG. 1 is a high-level block diagram of a wireless communication system in accordance with various aspects.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Referring to FIG. 1, a high-level block diagram of a wireless communication system 100 in accordance with various aspects presented herein is illustrated. In accordance with one aspect, system 100 can include one or more base stations 110 that can communicate data, control signaling, and/or other information on a forward link or "downlink" to one or more receiving users 120 and 130. While not illustrated in FIG. 1, it should be appreciated that one or more receiving users 120 and/or 130 can additionally transmit information on a reverse link or "uplink" to a base station 110. Further, system 100 can include any number of base stations 110 and receiving users 120 and 130.

It should additionally be appreciated that receiving users 120 and/or 130 can comprise and/or provide the functionality of a wireless terminal, which can be connected to a computing device such as a laptop computer or desktop computer and/or a self-contained device such as a cellular telephone, a personal digital assistant (PDA), or another suitable device. A wireless terminal can also be called a system, subscriber unit, subscriber station, mobile station, mobile, remote station, remote terminal, access terminal, user terminal, user agent, user device, user equipment, etc. Additionally and/or alternatively, one or more base stations 110 in the system 100 can comprise and/or provide the functionality of a wireless access point or Node B, for example, serving as a router between one or more other stations and a wireless access network associated with the access point.

In accordance with one aspect, system 100 can comprise a single-cell wireless system, wherein base station 110 has M transmit (Tx) antennas 112 that can communicate with K geographically dispersed users 120 and/or 130, each having N receive (Rx) antennas 122 and/or 132. In one example, the number of users 120 and/or 130 can outnumber the number of transmit antennas 112 at the base station 110, and the base station 110 can have at least as many available transmit antennas 112 as the users 120 and/or 130 have receive antennas. In another example, only J of the K users 120 and/or 130 are allowed to communicate with the base station 110 simultaneously at any time slot t. In such an example, the set of users 120 and/or 130 which are assigned a non-zero rate of communication with the base station 110 at time slot t can be represented as A(t). The cardinality of A(t) can be expressed as $|A(t)|=J$, with $1 \leq J \leq K$. If the k-th of the users 120 and/or 130 is an active user at time slot t, then the signal received by said user can be given by:

$$Y_k^t = \sqrt{\alpha_k} H_k^t X^t + W_k^t, k \in A(t), \quad (1)$$

where $X^t$ is an M×1 vector of the transmitted signals in time slot t, $Y_k^t$ is an N×1 vector of the received signal at the k-th user 120 and/or 130 in time slot t, and $W_k^t$ is an N×1 vector of additive noise whose entries are independent and identically distributed (i.i.d.) complex Gaussians with zero mean and variance $N_0$. As further used in Equation (1), $H_k^t$ is an N×M channel matrix constructed such that the (n,m)-th entry $h_k^t(n,m)$ CN (0,1) is an i.i.d. complex Gaussian with zero mean and unit variance, where the scalar $h_k^t(n,m)$ represents the complex channel gain from the m-th transmit antenna 112 at the base station 110 to the n-th receive antenna 122 and/or 132 of the k-th user 120 and/or 130 at time slot t. The scalar $\alpha_k$ used in Equation (1) denotes the power attenuation coefficient on the path from the base station 110 to the k-th user 120 and/or 130. In one example, the attenuation coefficient $\alpha_k$ is equal to $d_k^{-c}$, where $d_k$ denotes the distance from the base station 110 to the k-th user 120 and c is a constant between 2 and 4.

In accordance with another aspect, the total transmitted power of the system 100 can be equal to 1, e.g., $Tr(X^t[X^t]^H)=1$, where $Tr(\cdot)$ represents the trace of a matrix. Thus, the total transmitted power of the system 100 can be independent of the number of transmit antennas 112 at the base station 110. In one example, the system 100 can utilize a block-fading channel model, in which the channel $h_k^t(n,m)$ $\forall m,n,k$ is quasi-static and frequency non-selective in time slot t but varies independently in different time slots. Additionally and/or alternatively, the channel $h_k^t(n,m)$ can be modeled as uncorrelated in time slot t with other channels $h_{k'}^t(n',m')$ for any $(m',n',k') \neq (m,n,k)$. In accordance with one aspect, system 100 can operate under an assumption that the MIMO channels are perfectly known at the receiving users 120 and 130 but are unknown at the transmitting base station 110.

In one example, a signal x(m) can be transmitted through an m-th transmit antenna 112 at a given time slot. Further, for all transmit antennas m 112 where m=1, ..., M, independent signals x(m) can be transmitted by the respective transmit antennas. In such an example, the average transmit power per transmit antenna 112 can be $$\frac{1}{M},$$

e.g., $$E[|x(m)|^2] = \frac{1}{M},$$

thereby ensuring that the combined transmit power of the transmit antennas 112 is 1. In this example, a signal received by the n-th antenna 122 and/or 132 of a k-th receiving user 120 and/or 130 from the m-th transmit antenna 112 of the base station 110 can then be expressed as follows:

$$y_k(n) = \sqrt{\alpha_k} \sum_{m=1}^{M} h_k(n,m)x(m) + w_k(n). \quad (2)$$

By assuming that the signal x(m) is the desired signal for the k-th receiving user 120 and/or 130 and regarding other signals x(m'), m'≠m as interference, the instantaneous SINR of the received signal $y_k(n)$ can be expressed as follows:

$$SINR_{m,n}^{(k)} \frac{|h_k(n,m)|^2}{\frac{M}{\bar{\gamma}_k} + \sum_{m' \neq m} |h_k(n,m')|^2}, \quad (3)$$

where $\bar{\gamma}_k = \alpha_k/N_0$ is the downlink signal-to-noise ratio (SNR) of the k-th receiving user 120 and/or 130.

Existing approaches to downlink scheduling based on SINR feedback in MIMO networks generally regard each receive antenna 122 and/or 132 at each receiver 120 and/or 130 as a separate virtual user. Thus, for a MIMO system having K users with N receive antennas each, such approaches effectively treat the system as having NK single-antenna receivers. Based upon feedback of the maximum SINR of each of these virtual users along with the index m of a transmit antenna that achieves the maximum SINR for each virtual user, a base station can then transmit M independent signals to M virtual users with the highest SINR simultaneously. The maximum throughput R achieved through such an approach can be bounded by the following:

$$R \le E\left[\sum_{m=1}^{M} \log_2\left(1 + \max_{n \in S_r, k \in S_u} SINR_{m,n}^{(k)}\right)\right], \quad (4)$$

where $S_t = \{1, \ldots, M\}$, $S_r = \{1, \ldots, N\}$ and $S_u = \{1, \ldots, K\}$. This asymptotic analysis provided shows that the achievable throughput of such an approach is M log log(NK) when K goes to infinity. However, these and/or other similar existing approaches require feedback of KN SINR values, and the feedback load increases as the number of receive antennas increases.

In contrast to these existing approaches, the system 100 can include a scheduling component 114 that can facilitate MIMO downlink scheduling based on feedback of only K real SINR values. In one example, the scheduling component 114 can facilitate downlink MIMO scheduling for a system with finite rate feedback without inducing a loss of throughput typically associated with existing limited feedback scheduling algorithms. In accordance with one aspect, the scheduling component can schedule transmission of one or more signals at the transmit antennas 112 to respective receiving users 120 and/or 130 based at least in part upon feedback received by the users 120 and/or 130. While the scheduling component 114 is illustrated in FIG. 1 as located within the base station 110, it should be appreciated that the scheduling component 114 can be located anywhere within the communications system 100 that would enable the scheduling component 114 to be operatively associated with the transmit antennas 112 and receive feedback from users 120 and/or 130.

In accordance with one aspect, the scheduling component 114 can be operable to implement a multiuser scheduling algorithm for MIMO downlink transmission based on full SINR feedback from one or more users 120 and/or 130. In one example, a full feedback scheduling algorithm implementable by system 100 can be implemented as a two step process, wherein feedback is generated and communicated by users 120 and/or 130 in a first step, followed by scheduling at the base station 110 in a second step.

Figure 2:
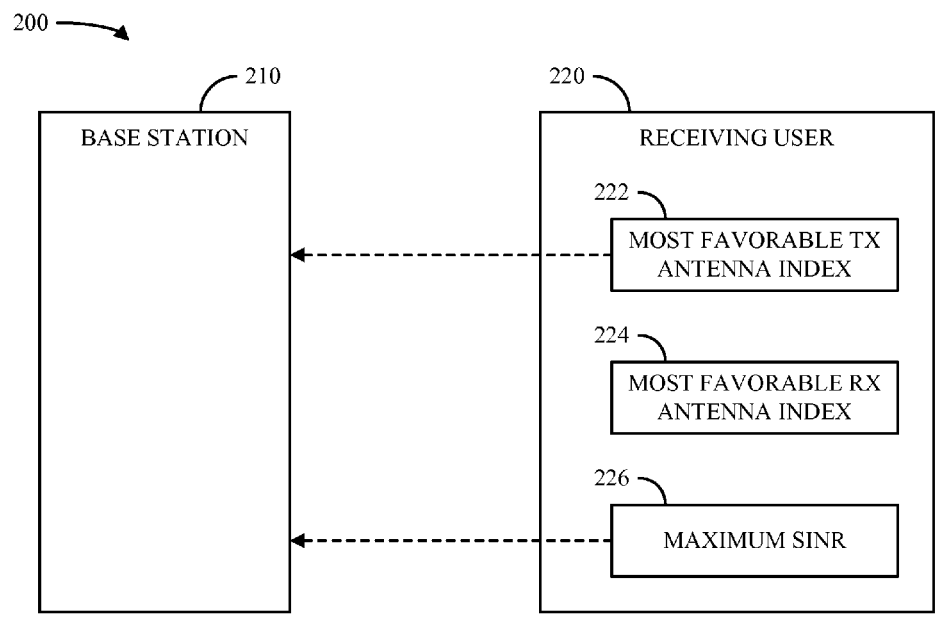
FIG. 2 is a block diagram of a system for generating and providing feedback to a base station in accordance with various aspects.

Feedback generation and transmission conducted in the first step of the above algorithm is illustrated in the context of an example system 200 in FIG. 2. As system 200 illustrates, users 220 in the system 200, represented by k(k=1, . . . , K), can firstly select their respective most favorable transmit antennas 222, represented by $Tx_k(Tx_k \in S_t)$, and their respective most favorable receive antennas 224, represented by $Rx_k$ ($Rx_k \in S_r$), for achieving a maximum SINR $B_k$ 226. In one example, the maximum SINR 226 for a user 220 can be expressed as follows:

$$B_k = \max_{m \in S_t, n \in S_r} SINR_{m,n}^{(k)}. \quad (5)$$

Once a user 220 has generated parameters 222-226, the maximum SINR $B_k$ 226 and most favorable transmit antenna index $Tx_k$ 222 can be sent by the user 220 to a serving base station 210 for scheduling. While system 200 illustrates generation and communication of parameters 222-226 at a single user 220 for brevity, it should be appreciated that the operations illustrated by FIG. 2 can be performed by any number of users in an associated communication system.

Figure 3:
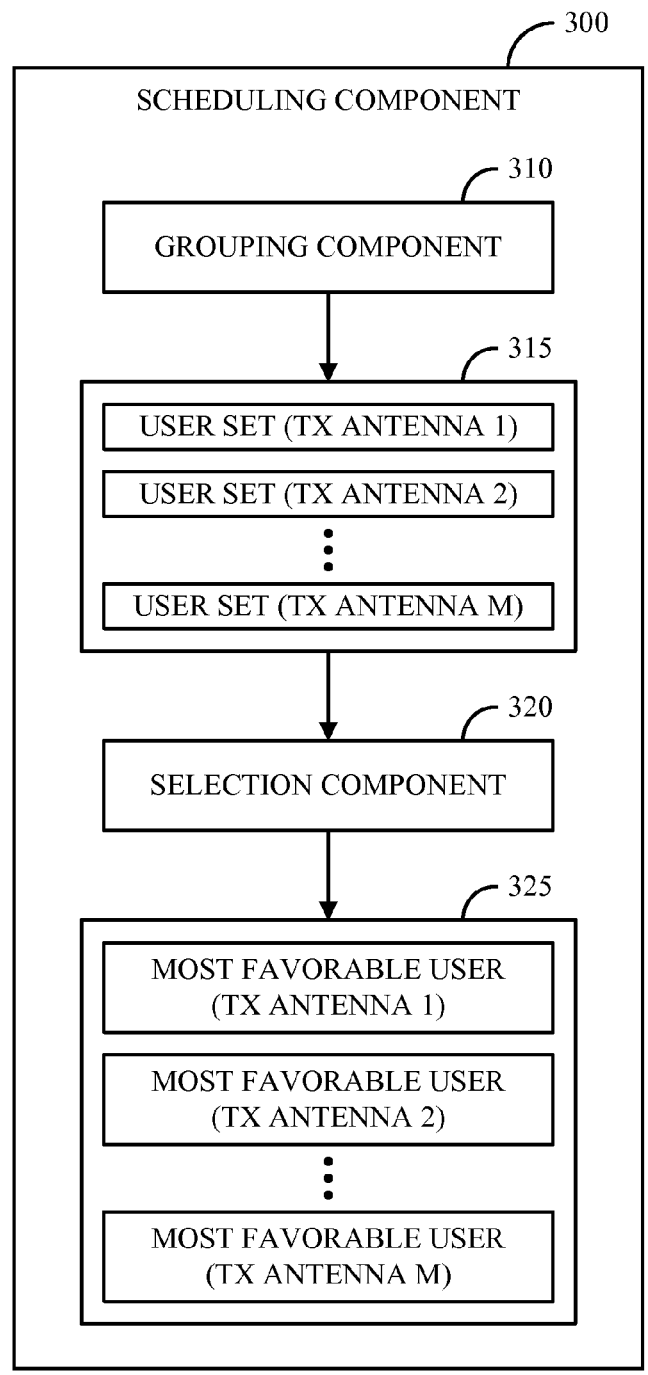
FIG. 3 is a block diagram of a component that schedules respective users for communication based on user feedback in accordance with various aspects.

Once transmit antenna indices and SINR values have been received at a base station from one or more users, FIG. 3 illustrates scheduling conducted in the second step of the above algorithm in the context of an example scheduling component 300. It should be appreciated that the example scheduling component 300 can be implemented, for example, at a base station (e.g., base station 110), at another appropriate network entity, and/or as a stand-alone component in an associated communication system. In one example, for each transmit antenna scheduled by the scheduling component 300, the scheduling component 300 can employ a grouping component 310 and/or another suitable component to cluster respective users that provided the index of each transmit antenna into corresponding groups 315. For example, the grouping component 310 can group users providing indices $Tx_k = m$, (m=1, . . . , M) into sets $I_m$ such that:

$$I_m = \{k | Tx_k = m, k = 1, \ldots, K\}. \quad (6)$$

Based on the generated groups 315, a selection component 320 and/or another suitable component of the scheduling component 300 can then select the most favorable M users 325, which can be represented as $k^*_m$ (m=1, . . . , M), based on the following constraint:

$$k_m^* = \underset{k \in I_m}{\arg\max} B_k, \, m = 1, \ldots, M. \quad (7)$$

Figure 4:
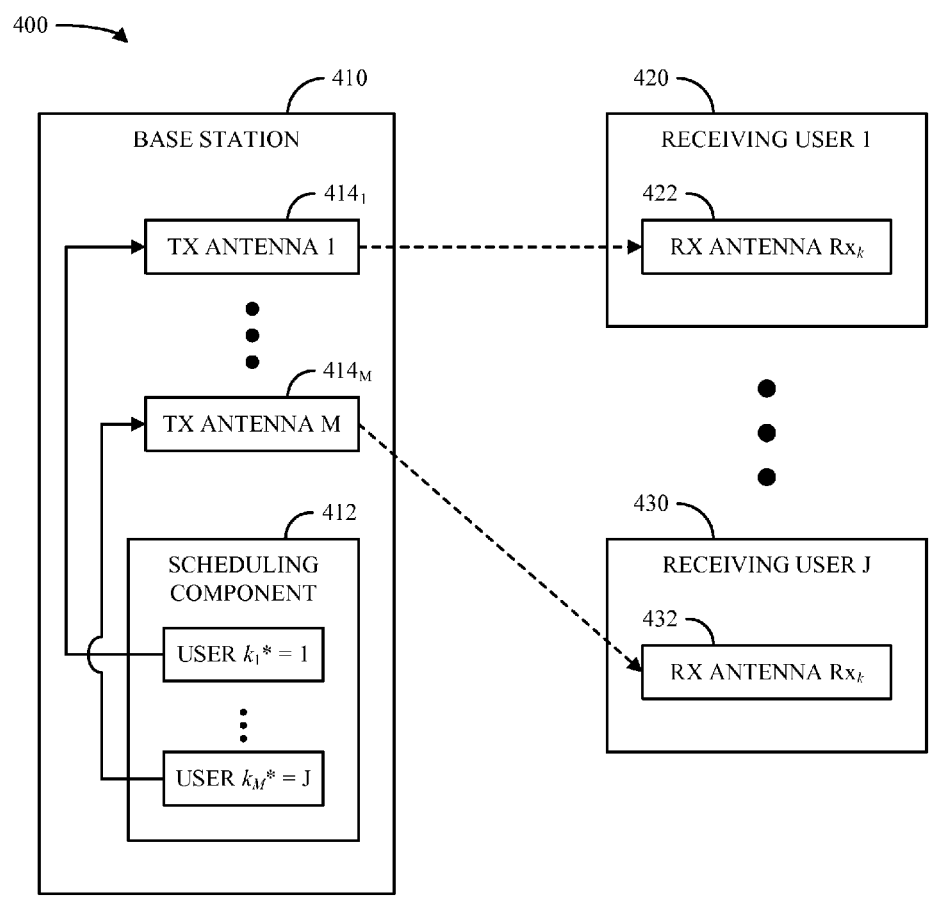
FIG. 4 is a block diagram of a system for transmitting information to respective users based on a communication schedule in accordance with various aspects.

Once scheduling has been performed by selecting the most favorable users $k^*_m$ for all $m=1, \ldots, M$, transmission can be conducted based on the determined schedule as illustrated by system 400 in FIG. 4. As system 400 illustrates, a scheduling component 412 at a base station 410 can provide the determined most favorable users $k^*_m$ for respective transmit antennas 414. Based on this information, the transmit antennas 412 can be used to communicate signals x(m) to respective selected users 420 and/or 430. At the users 420 and/or 430, signals transmitted by the base station 410 can then be received at most favorable receive antennas $Rx_{k^*_m}$ 422 and/or 432. The most favorable receive antennas $Rx_{k^*_m}$ 422 and/or 432 for respective users 420 and/or 430 can be determined, for example, as described supra with regard to FIG. 2. In such an example, since receive antenna selection is performed at each of the users 420 and/or 430, the total feedback load at each time slot can be regarded as K real values $\{B_1, \ldots, B_K\}$ plus $K\lceil \log_2 M \rceil$ bits of $Tx_k$, $\forall k$, where $\lceil x \rceil$ denotes the smallest integer larger than x.

In accordance with one aspect, the average achievable throughput of the full feedback scheduling algorithm illustrated by FIGS. 2-4 over Rayleigh fading channels can be derived as follows. Under Gaussian codes and minimum distance decoding at a receiver, the instantaneous sum-rate of scheduling with SINR feedback can be expressed by the following:

$$R = \sum_{m=1}^{M} R_m = \sum_{m=1}^{M} \log_2\left(1 + SINR_{m,Rx_{k^*_m}}^{(k^*_m)}\right), \quad (8)$$

where $SINR_{m,Rxk^*_m}^{(k^*_m)}$ is the SINR of a user $k^*_m$ scheduled by an m-th transmit antenna and $Rx_{k^*_m}$ is the receive antenna selected by the user $k^*_m$. Based on this expression, the following can be observed:

$$\begin{aligned} SINR_{m,R_{k^*_m}}^{(k^*_m)} &= \max_{k \in I_m} B_k \\ &= \max_{k \in I_m} \max_{m \in S_t, n \in S_r} SINR_{m,n}^{(k)} \\ &\approx \max_{l \in \{1, \ldots, NK\}} Z_l, \end{aligned} \quad (9)$$

$$Z_l \frac{|g_l|^2}{\frac{M}{\bar{\gamma}_l} + \sum_{j=1}^{M-1} |\tilde{g}_{l,j}|^2} \quad (10)$$

where
with $g_l, \tilde{g}_{l,j}$ CN (0,1) for all $l=1, \ldots, NK$ and $j=1, \ldots, M-1$. Since $Prob\{Tx_k=m\}=1/M$ for any k and m for i.i.d. parameters $h_k(n,m) \forall n,m$ and k, it can be seen that $E|I_m|$ approaches K|M. Thus, it can be assumed that the SINR of a scheduled user is selected from $E|I_m|\cdot|S_t|\cdot|S_r|=NK$ candidates as shown in the last step of Equation (9).

Further, it can be appreciated that since the parameters $Z_l$ are i.i.d., Equation (10) can be rewritten as $Z=X/(M/\bar{\gamma}+Y)$ for all identical $\bar{\gamma}_2$, where X $X^2(2)$ and Y $X^2$ (2M−2). Thus, the probability density function (PDF) and cumulative distribution function (CDF) of Z can be given by the following:

$$f_Z(t) = \frac{e^{-Mt/\bar{\gamma}}}{(1+t)^M}\left(\frac{M}{\bar{\gamma}}(1+t) + M - 1\right), \, t \geq 0, \quad (11)$$

$$F_Z(t) = 1 - \frac{e^{-Mt/\bar{\gamma}}}{(1+t)^{M-1}}, \, t \geq 0. \quad (12)$$

Next, the following denotations can be made:

$$P\max_{k \in I_m} \max_{m \in S_t, n \in S_r} SINR_{m,n}^{(k)}, \quad (13)$$

$$U \max_{l \in \{1, \ldots, NK\}} Z_l. \quad (14)$$

Based on these denotations and by using Equations (8) and (9), system throughput pursuant to the scheduling algorithm illustrated by FIGS. 2-4 averaged over Rayleigh fading channels can be given by the following:

$$\begin{aligned} E(R) &= \sum_{m=1}^{M} E\log_2\left(1 + SINR_{m,Rx_{k^*_m}}^{(k^*_m)}\right) \\ &= M \int_0^\infty \log_2(1+t) f_P(t) dt \\ &\approx M \int_0^\infty \log_2(1+t) f_U(t) dt, \end{aligned} \quad (15)$$

where $f_U(t)$ is the PDF of U. Using order statistics, the following can be derived from Equation (14):

$$f_U(t) = NK f_Z(t)[F_Z(t)]^{NK-1} \quad (16)$$

for all identical $\bar{\gamma}_l$. Therefore, it can be observed that the achievable throughput of the MIMO downlink scheduling illustrated by FIGS. 2-4 averaged over fading channels can be expressed as follows:

$$E(R) \approx KMN \int_0^\infty \log_2(1+t) f_Z(t) (F_Z(t))^{NK-1} dt. \quad (17)$$

It can be further appreciated that a numerical approximation for system throughput can be obtained by substituting Equations (11) and (12) into Equation (17).

Under conventional scheduling approaches, each receive antenna is viewed as an individual user when N>1. By doing so, a K-user M×N system is effectively converted to a K'-user M×N' system, where K'=NK and N'=1. In the case where each user has only a single receive antenna, Equation (15) can also be used to evaluate the performance of these and/or similar conventional approaches for K'=NK and N'=1. By doing so, the following can be derived:

$$\begin{aligned} E(R) &\approx K'MN \int_0^\infty \log_2(1+t) f_Z(t)(F_Z(t))^{N'K'-1} dt = \\ &NKM \int_0^\infty \log_2(1+t) f_Z(t)(F_Z(t))^{NK-1} dt. \end{aligned} \quad (18)$$

By observing the right hand side of Equation (17) compared to the right hand side of Equation (18), it can be observed that both equations are identical. Thus, it can be appreciated that the scheduling algorithm illustrated by FIGS. 2-4 does not induce performance loss compared with conventional scheduling approaches.

In accordance with another aspect, the scheduling component 114 in system 100 can utilize a scheduling algorithm based on quantized SINR feedback from one or more users 120 and/or 130. In one example, a quantized feedback scheduling algorithm implementable by system 100 can be implemented as a two step process, wherein quantized feedback is generated and communicated by users 120 and/or 130 in a first step, followed by scheduling at the base station 110 in a second step.

Figure 5:
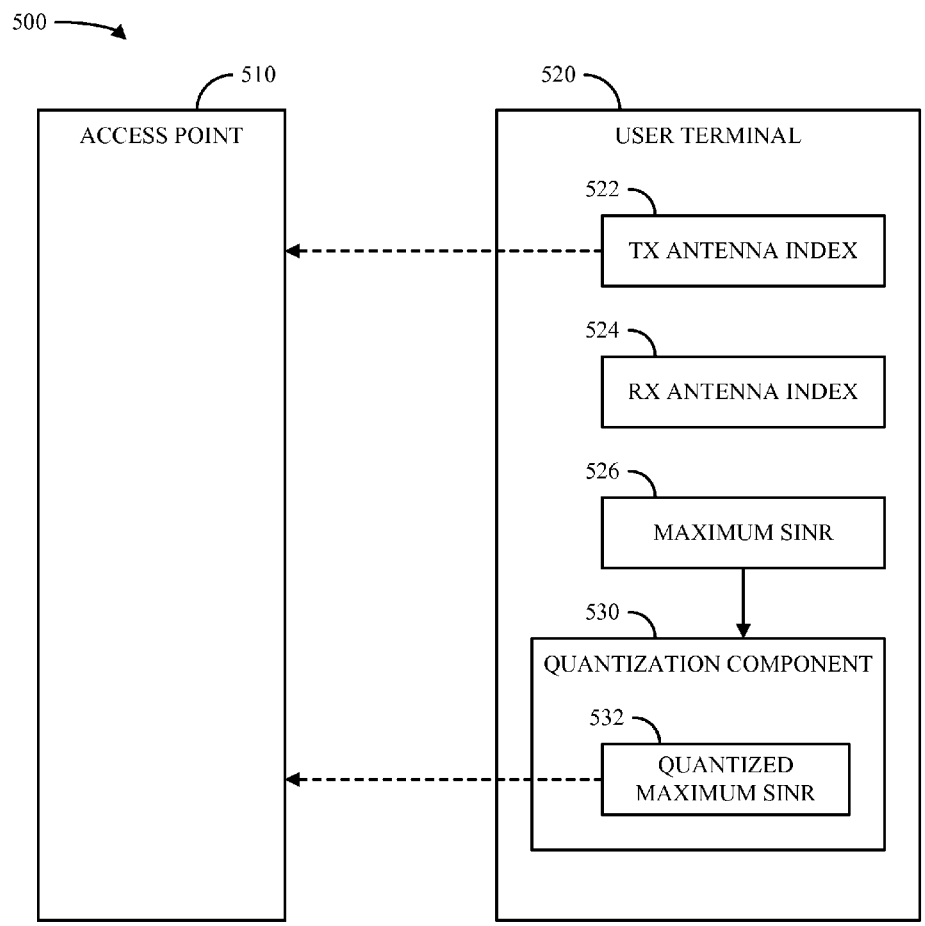
FIG. 5 is a block diagram of a system for generating and providing limited feedback to an access point in accordance with various aspects.

Generation and transmission of quantized feedback in the first step of the above quantized feedback algorithm is illustrated in the context of an example system 500 in FIG. 5. As system 500 illustrates, user terminals 520 in the system 500, represented by k(k=1, . . . , K), can firstly select respective indices 522 of most favorable transmit antennas $Tx_k(Tx_k \in S_t)$ and respective indices 524 of most favorable receive antennas $Rx_k(Rx_k \in S_r)$ for achieving a maximum SINR $B_k$ 526. In one example, the maximum SINR 526 for a user 520 can be expressed by Equation (5) supra. Following identification of a real-valued maximum SINR $B_k$ 526, a user terminal can employ a quantization component 530 and/or another suitable component to quantize $B_k$ into one of a predetermined number of levels $q_k=Q(B_k)$, thereby generating a quantized maximum SINR 532. In one example, the quantization levels utilized by the quantization component 530 can be expressed as follows:

$$Q(B_k) = \begin{cases} 0, & 0 \le B_k < \lambda_1 \\ i, & \lambda_i \le B_k < \lambda_{i+1}, i=1, \ldots, L-2. \\ L-1, & B_k \ge \lambda_{L-1} \end{cases} \quad (19)$$

In one example, the number of levels L used for $Q(B_k)$ can be determined at least in part by the number of bits b required to represent a value $B_k$, e.g., based on $L=2^b$. Once a user 520 has generated a Tx antenna index 522 and a quantized maximum SINR 532, these and/or other parameters can be communicated to a base station or access point 510 for scheduling. While system 500 illustrates generation and communication of feedback parameters at a single user 520 for brevity, it should be appreciated that the operations illustrated by FIG. 5 can be performed by any number of users in an associated communication system.

Figure 6:
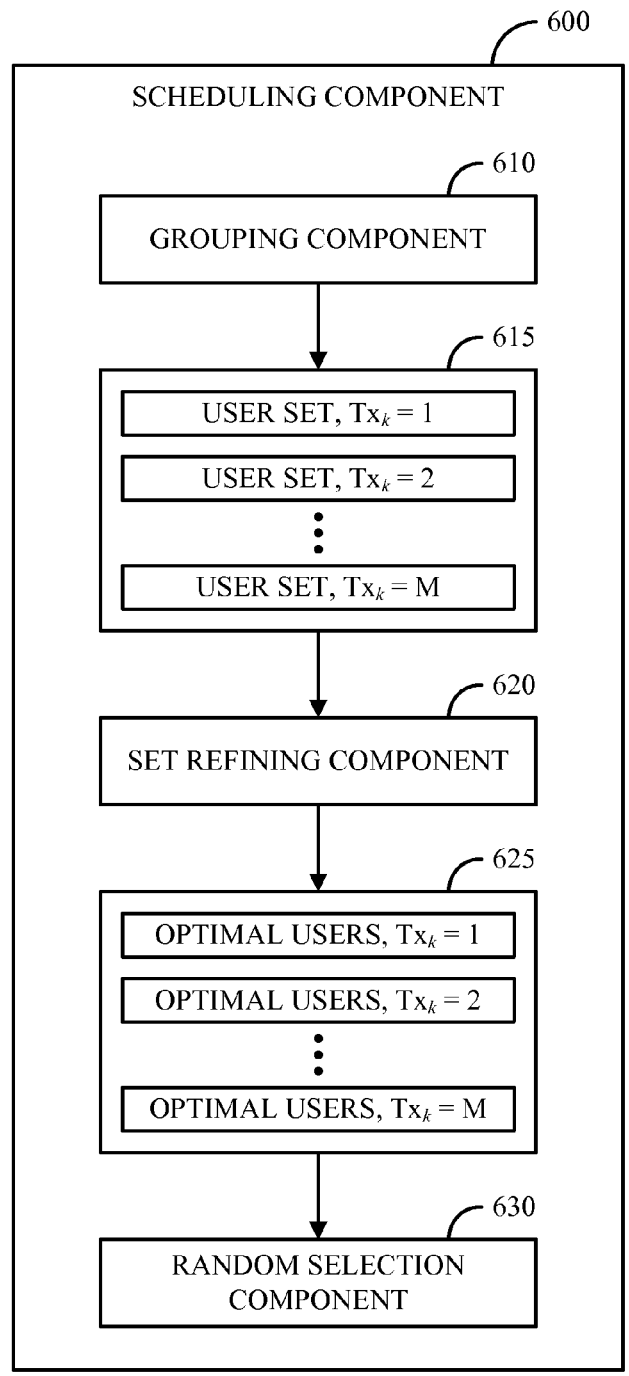
FIG. 6 is a block diagram of a component that schedules respective users for communication based on quantized user feedback in accordance with various aspects.

Once transmit antenna indices and quantized SINR values have been received at a base station from one or more users, FIG. 6 illustrates example scheduling that can be conducted by a scheduling component 600 in the second step of the above quantized feedback algorithm. It should be appreciated that the example scheduling component 600 can be implemented, for example, at a base station (e.g., base station 110), at another appropriate network entity, and/or as a stand-alone component in an associated communication system. In one example, for each transmit antenna scheduled by the scheduling component 600, the scheduling component 600 can employ a grouping component 610 and/or another suitable component to cluster respective users providing the index of each transmit antenna into corresponding user sets 615. For example, the grouping component 610 can group users providing index $Tx_k=m$ into a set $I_m$ as provided by Equation (6) above. From these generated user sets 615, a set refining component 620 and/or another suitable component at the scheduling component 600 can further cluster users in user sets 615 for each respective transmit antenna that achieve a maximum of $q_k$ for all $k \in I_m$ into optimal user sets $J_m$ 625. These optimal sets $J_m$ can be expressed as follows:

$$J_m = \underset{k \in I_m}{\operatorname{argmax}} q_k. \quad (20)$$

From Equation (20), it can be appreciated that $J_m \subseteq I_m$ as $J_m=\{k|k=\arg \max(q_k), k \in I_m\}$. From the optimal user sets 625, a random selection component 630 and/or another suitable component can allocate an m-th transmit antenna to a user $k^*_m$ by randomly selecting users from a set $J_m$ as follows:

$$k_m^* = rand\{J_m\}. \quad (21)$$

Once scheduling has been performed by selecting the most favorable users $k^*_m$ for all m=1, . . . , M, transmission can be conducted based on the determined schedule in a similar manner to that described above for full feedback scheduling as illustrated by system 400 in FIG. 4.

In accordance with one aspect, the achievable throughput of the quantized feedback scheduling algorithm illustrated by FIGS. 5-6 can be derived as follows. Initially, it can be observed that the instantaneous sum-rate achieved by the quantized feedback scheduling technique illustrated by FIGS. 5-6 can be given by the following:

$$R = \sum_{m=1}^{M} \log_2\left(1 + SINR_{m,Rx_{k_m^*}}^{(k_m^*)}\right) \quad (22)$$

$$= \sum_{m=1}^{M} \log_2(1 + rand\{B_k\}_{k \in J_m}),$$

where $rand\{B_k\}_{k \in J_m}$ denotes the random selection of an element from the set $\{B_k\}_{k \in J_m}$ and $B_k$ corresponds to the expression for SINR given by Equation (5). To simplify calculation, $rand\{B_k\}_{k \in J_m}$ can be expressed simply as V. Accordingly, the average total throughput achieved by quantized feedback scheduling can be given by the following:

$$E(R) = M \int_0^\infty \log_2(1+v) f_V(v) dv, \quad (23)$$

where $f_V(v)$ denotes the PDF of V.

Next, if $F_V(v)$ is used to denote the CDF of V and $$K' = \frac{K}{M},$$

it can be appreciated that, for a large number of users, the cardinality of the set $I_m$ is equal to $K'$ for all m because $$Prob\{Tx_k = m\} = \frac{1}{M}$$

for any k and m. By using $A_i$ to denote the range $[\lambda_i, \lambda_{i+1})$ for i=0, 1, . . . , L-1, where $\lambda_0=0$ and $\lambda_L=\infty$, the CDF $F_V$ can be derived for at least two cases as follows.

In one example, the first such case can hold when $0 \le V < \lambda_1$. In such a case, it can be appreciated that the maximum SINR $B_k$ of a scheduled user is in range $A_0$. Thus, it can be further appreciated that $B_k$ for all $k \in I_m$ are also in range $A_0$. As a result, the CDF of V can be expressed as follows:

$$F_V(v) = F_B(v)[F_B(\lambda_1)]^{K'-1}, 0 \le v < \lambda_1, \quad (24)$$

where $F_B(v)$ denotes the CDF of B.

Additionally and/or alternatively, the second case can hold when $\lambda_i \le V < \lambda_{i+1}$ for i=1, . . . , L-1. In such a case, it can be appreciated that the maximum SINR $B_k$ of a scheduled user is in range $A_i$. Additionally, for any given $1 \le r \le K'$ in such a case, it can be assumed that there exist $(r-1)$ other users having a $B_k$ in region $A_i$. In accordance with one aspect, a scheduled user is selected because it maximizes the value of $B_k$ for a set of users. Accordingly, it can be assumed that the $B_k$ of the remaining $(K'-r)$ users must be smaller than $\lambda_i$. In view of this observation, the CDF of V can be expressed as follows:

$$F_V(v) = [F_B(\lambda_i)]^{K'} + \sum_{r=1}^{K'} \binom{K'}{r} [F_B(v) - F_B(\lambda_i)] \times [F_B(\lambda_i)]^{K'-r} [F_B(\lambda_{i+1}) - F_B(\lambda_i)]^{r-1}, \quad (25)$$

for $\lambda_i \le v < \lambda_{i+1}$. Consequently, the corresponding PDF $f_V(v)$ can be given by the following:

$$f_V(v) = \begin{cases} f_B(v)[F_B(\lambda_1)]^{K'-1}, \text{ for } 0 \le v < \lambda_1 \\ \sum_{r=1}^{K'} \binom{K'}{r} [F_B(\lambda_i)]^{K'-r} \times [F_B(\lambda_{i+1}) - F_B(\lambda_i)]^{r-1} f_B(v), \\ \text{ for } \lambda_i \le v < \lambda_{i+1}, i = 1, \ldots, L-1, \end{cases} \quad (26)$$

where $F_B(v) \approx [F_Z(v)]^{MN}$ and $f_B(v) \approx MNf_Z(v)F_Z(v)^{MN-1}$. In one example, the PDF $f_Z(v)$ and the CDF $F_Z(v)$ are respectively given by Equations (11) and (12). Further, by substituting Equation (26) into Equation (23), a numerical approximation for the achievable throughput of quantized feedback scheduling as illustrated by FIGS. 5-6 can be obtained.

By way of a specific, non-limiting example, quantized feedback scheduling as illustrated by FIGS. 5-6 can be based on 1-bit quantization. In this 1-bit quantization example, one or more users can provide a quantized value of 0 or 1 to a scheduling component according to a threshold $\lambda_1$, thereby obtaining a minimal feedback load. By way of example, for 1-bit quantization, Equation (26) can be rewritten as follows:

$$f_V(v) = \begin{cases} [F_B(\lambda_1)]^{K'-1} f_B(v), & 0 \le v < \lambda_1 \\ \frac{1 - [F_B(\lambda_1)]^{K'}}{1 - F_B(\lambda_1)} f_B(v), & \lambda_1 \le v. \end{cases} \quad (27)$$

As a result, average achievable system throughput can be computed by applying Equation (23) as follows:

$$E(R) = M[F_B(\lambda_1)]^{K'-1} \int_0^{\lambda_1} \log_2(1+v) f_B(v) dv + M \frac{1 - [F_B(\lambda_1)]^{K'}}{1 - F_B(\lambda_1)} \int_{\lambda_1}^{\infty} \log_2(1+v) f_B(v) dv. \quad (28)$$

In one example, Equation (28) can leverage approximation obtained from $F_B(v) \approx [F_Z(v)]^{MN}$ and $f_B(v) \approx MNf_Z(v) F_Z(v)^{MN-1}$ with $K' = K/M$. Based on Equation (28), the PDF $f_Z(v)$ and the CDF $F_Z(v)$ are respectively given by Equations (11) and (12).

It can be observed from the above that as K goes to infinity (e.g., while $K' \to \infty$), $[F_Z(\lambda_1)]^{K'MN} \to 0$ for a fixed value $\lambda_1 < \infty$. Accordingly, the throughput of Equation (28) can be derived as follows:

$$\lim_{K \to \infty} E(R) \approx \frac{M^2 N}{1 - [F_Z(\lambda_1)]^{MN}} \times \int_{\lambda_1}^{\infty} \log_2(1+v) f_Z(v) [F_Z(v)]^{MN-1} dv. \quad (29)$$

As shown by Equation (29), multiuser diversity can be lost for any fixed $\lambda_1$ as the total rate does not depend on the number of users K when K goes to infinity.

Further, it can be appreciated that when $\lambda_1 = 0$, the quantized feedback scheduling illustrated by FIGS. 5-6 can be regarded as equivalent to Round-Robin scheduling, in which either a single user is scheduled randomly from all users or multiple users are scheduled one by one in a loop. In one example, the throughput of such a case can be derived from Equation (28) as follows:

$$E(R) \approx M^2 N \int_0^{\infty} \log_2(1+v) f_Z(v) [F_Z(v)]^{MN-1} dv. \quad (30)$$

As Equation (30) demonstrates, multiuser diversity can be lost in the case of $\lambda_1 = 0$ in a similar manner to Round-Robin scheduling.

Figure 7:
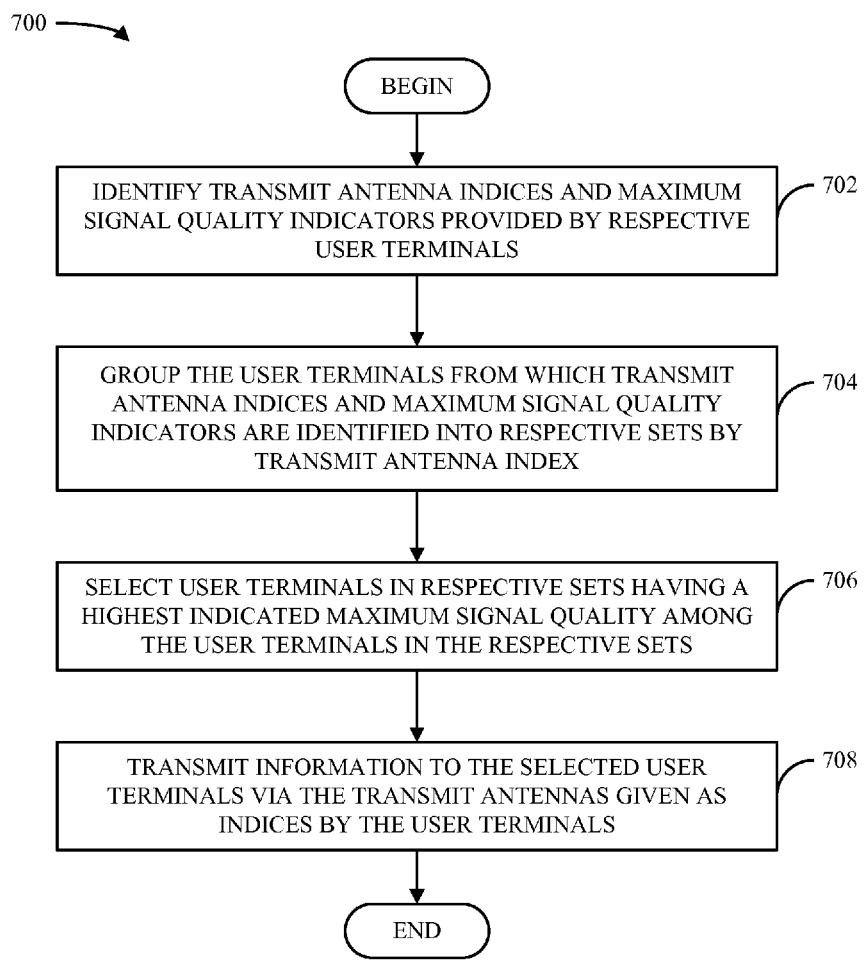
FIG. 7 is a flowchart of a method for multiuser scheduling in a wireless communication system.
Figure 8:
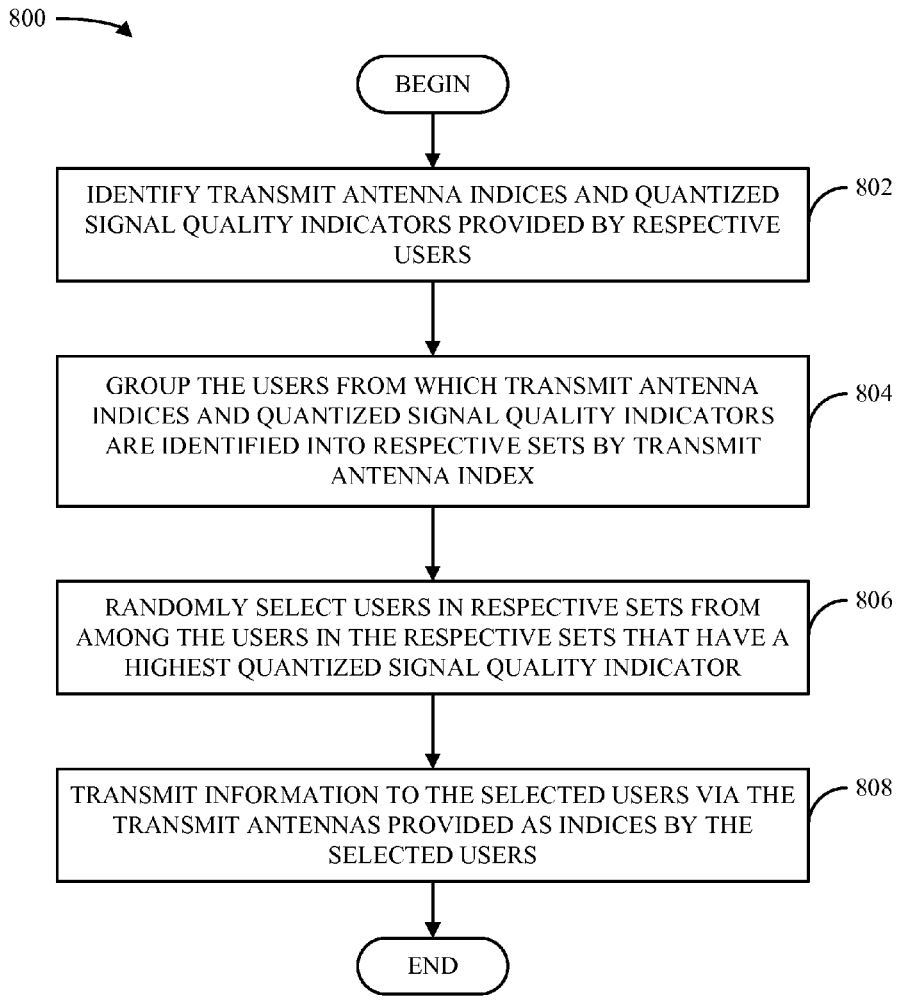
FIG. 8 is a flowchart of a method for scheduling users for communication in a wireless communication system based on quantized user feedback.

Referring now to FIGS. 7-8, methodologies that can be implemented in accordance with various aspects described herein are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodologies in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring to FIG. 7, a method 700 for multiuser scheduling in a wireless communication system (e.g., system 100) is illustrated. At 702, transmit antenna indices (e.g., most favorable Tx antenna indices 222) and maximum signal quality indicators (e.g., maximum SINR values 226) provided by respective user terminals (e.g., users 220) are identified (e.g., at a base station 210). At 704, the user terminals from which transmit antenna indices and maximum signal quality indicators are identified at 702 are grouped (e.g., by a grouping component 310 at a scheduling component 300) into respective sets (e.g., sets 315) by transmit antenna index. At 706, user terminals in respective sets created at 704 having a highest indicated maximum signal quality among the user terminals in their respective sets (e.g., most favorable users 325) are selected (e.g., by a selection component 320). At 708, information is transmitted to the user terminals selected at 706 via the transmit antennas (e.g., Tx antennas 414) given as indices by the user terminals.

FIG. 8 illustrates a method 800 for scheduling users for communication in a wireless communication system based on quantized user feedback. At 802, transmit antenna indices (e.g., Tx antenna indices 522) and quantized signal quality indicators (e.g., quantized maximum SINR values 532) provided by respective users (e.g., user terminals 520) are identified (e.g., at an access point 510). At 804, the users from which transmit antenna indices and quantized signal quality indicators are identified at 802 are grouped (e.g., by a grouping component 610 at a scheduling component 600) into respective sets (e.g., user sets 615) by transmit antenna index. At 806, users are randomly selected (e.g., by a random selection component 630) from among the users in respective sets created at 804 that have a highest quantized signal quality indicator in their respective sets (e.g., from among users provided in optimal user lists 625 provided by a set refining component 620). At 708, information is transmitted to the users selected at 706 via the transmit antennas given as indices by the selected users.

Figure 9:
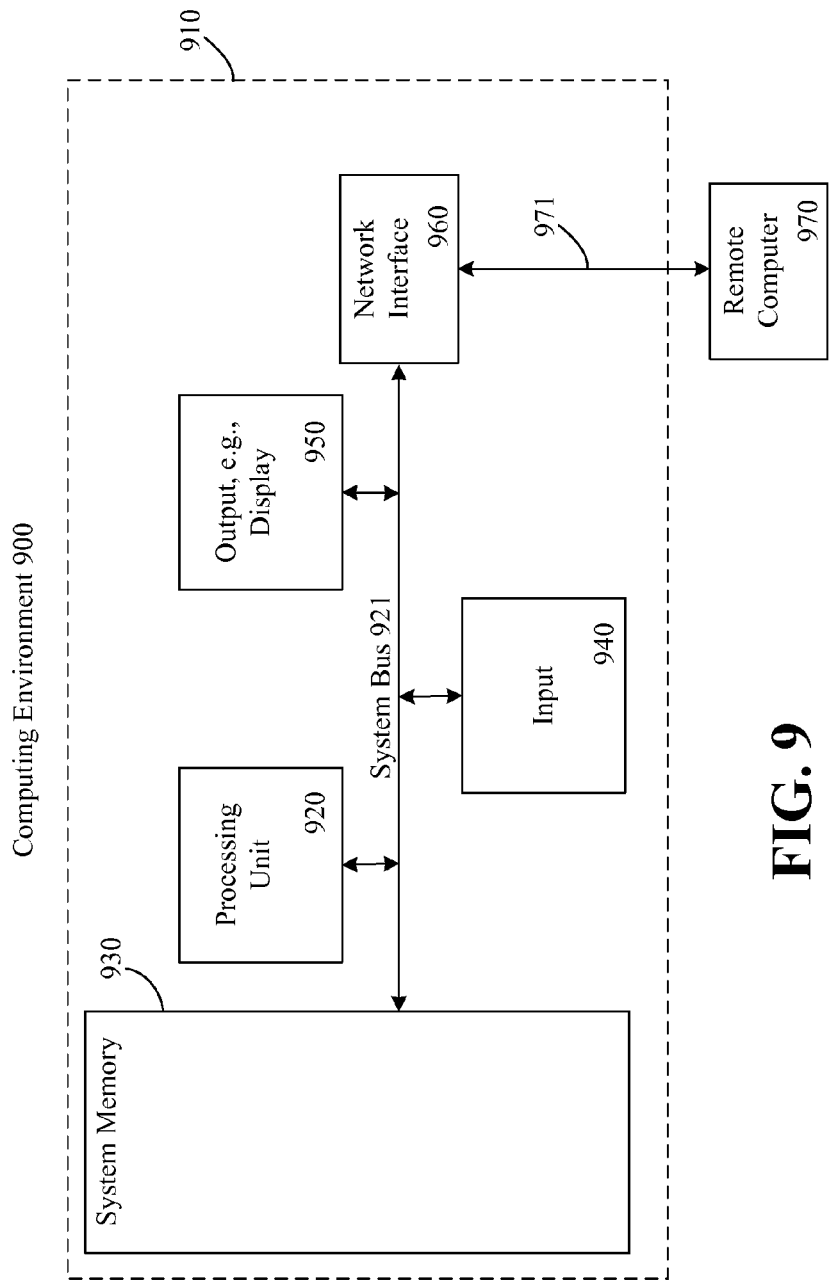
FIG. 9 is a block diagram of an example operating environment in which various aspects described herein can function.

Turning to FIG. 9, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below in FIG. 9 is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer-executable instructions, such as program modules, being executed by one or more computers, such as client workstations, servers or other devices. Those skilled in the art will appreciate that the claimed subject matter can also be practiced with other computer system configurations and protocols.

FIG. 9 thus illustrates an example of a suitable computing system environment 900 in which the claimed subject matter can be implemented, although as made clear above, the computing system environment 900 is only one example of a suitable computing environment for a media device and is not intended to suggest any limitation as to the scope of use or functionality of the claimed subject matter. Further, the computing environment 900 is not intended to suggest any dependency or requirement relating to the claimed subject matter and any one or combination of components illustrated in the example operating environment 900.

With reference to FIG. 9, an example of a remote device for implementing various aspects described herein includes a general purpose computing device in the form of a computer 910. Components of computer 910 can include, but are not limited to, a processing unit 920, a system memory 930, and a system bus 921 that couples various system components including the system memory to the processing unit 920. The system bus 921 can be any of several types of bus structures including a memory bus or memory controller, a peripheral bus, and a local bus using any of a variety of bus architectures.

Computer 910 can include a variety of computer readable media. Computer readable media can be any available media that can be accessed by computer 910. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable, volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 921 through a non-removable memory interface such as an interface, and a magnetic disk drive or optical disk drive can be connected to the system bus 921 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 920 through user input 940 and associated interface(s) that are coupled to the system bus 921, but can be connected by other interface and bus structures, such as a parallel port, game port or a universal serial bus (USB). A graphics subsystem can also be connected to the system bus 921. In addition, a monitor or other type of display device can be connected to the system bus 921 via an interface, such as output interface 950, which can in turn communicate with video memory. In addition to a monitor, computers can also include other peripheral output devices, such as speakers and/or a printer, which can also be connected through output interface 950.

The computer 910 can operate in a networked or distributed environment using logical connections to one or more other remote computers, such as remote computer 970, which can in turn have media capabilities different from device 910. The remote computer 970 can be a personal computer, a server, a router, a network PC, a peer device or other common network node, and/or any other remote media consumption or transmission device, and can include any or all of the elements described above relative to the computer 910. The logical connections depicted in FIG. 9 include a network 971, such local area network (LAN) or a wide area network (WAN), but can also include other networks/buses. Such networking environments are commonplace in homes, offices, enterprise-wide computer networks, intranets and the Internet.

When used in a LAN networking environment, the computer 910 is connected to the LAN 971 through a network interface or adapter. When used in a WAN networking environment, the computer 910 can include a communications component, such as a modem, or other means for establishing communications over the WAN, such as the Internet. A communications component, such as a modem, which can be internal or external, can be connected to the system bus 921 via the user input interface at input 940 and/or other appropriate mechanism. In a networked environment, program modules depicted relative to the computer 910, or portions thereof, can be stored in a remote memory storage device. It should be appreciated that the network connections shown and described are exemplary and other means of establishing a communications link between the computers can be used.

Figure 10:
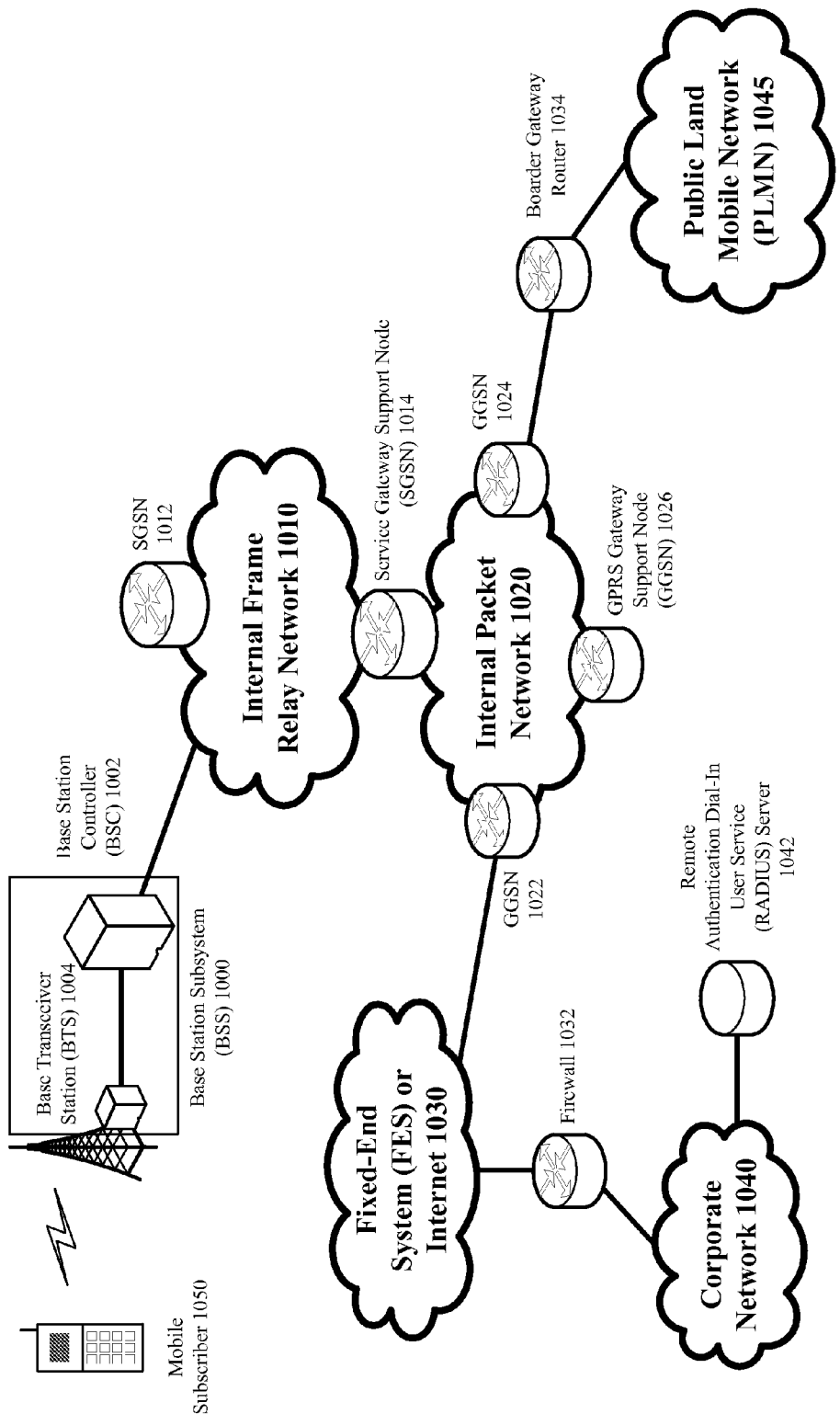
FIG. 10 illustrates an overview of a wireless network environment suitable for service by various aspects described herein.

Turning now to FIG. 10, an overview of a network environment in which the claimed subject matter can be implemented is illustrated. The above-described systems and methodologies can be applied to any wireless communication network; however, the following description sets forth an exemplary, non-limiting operating environment for said systems and methodologies. The below-described operating environment should be considered non-exhaustive, and thus the below-described network architecture is merely an example of a network architecture into which the claimed subject matter can be incorporated. It is to be appreciated that the claimed subject matter can be incorporated into any now existing or future alternative communication network architectures as well.

Referring back to FIG. 10, various aspects of the global system for mobile communication (GSM) are illustrated. GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 10 depicts an overall block diagram of an exemplary packet-based mobile cellular network environment, such as a GPRS network, in which the claimed subject matter can be practiced. Such an environment can include a plurality of Base Station Subsystems (BSS) 1000 (only one is shown), each of which can comprise a Base Station Controller (BSC) 1002 serving one or more Base Transceiver Stations (BTS) such as BTS 1004. BTS 1004 can serve as an access point where mobile subscriber devices 1050 become connected to the wireless network. In establishing a connection between a mobile subscriber device 1050 and a BTS 1004, one or more timing synchronization techniques as described supra can be utilized.

In one example, packet traffic originating from mobile subscriber 1050 is transported over the air interface to a BTS 1004, and from the BTS 1004 to the BSC 1002. Base station subsystems, such as BSS 1000, are a part of internal frame relay network 1010 that can include Service GPRS Support Nodes ("SGSN") such as SGSN 1012 and 1014. Each SGSN is in turn connected to an internal packet network 1020 through which a SGSN 1012, 1014, etc., can route data packets to and from a plurality of gateway GPRS support nodes (GGSN) 1022, 1024, 1026, etc. As illustrated, SGSN 1014 and GGSNs 1022, 1024, and 1026 are part of internal packet network 1020. Gateway GPRS serving nodes 1022, 1024 and 1026 can provide an interface to external Internet Protocol ("IP") networks such as Public Land Mobile Network ("PLMN") 1045, corporate intranets 1040, or Fixed-End System ("FES") or the public Internet 1030. As illustrated, subscriber corporate network 1040 can be connected to GGSN 1022 via firewall 1032; and PLMN 1045 can be connected to GGSN 1024 via boarder gateway router 1034. The Remote Authentication Dial-In User Service ("RADIUS") server 1042 may also be used for caller authentication when a user of a mobile subscriber device 1050 calls corporate network 1040.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A system, comprising:
    transmit antennas of a base station configured to transmit information to terminals via a MIMO communication link; and
    a scheduling component configured to
        group the terminals into sets corresponding to respective transmit antenna indices received via feedback data from the terminals,
        for a set of the sets, identify a subset of the terminals that report a highest one-bit quantized signal quality indication, and
        assign a transmit antenna, of the transmit antennas, for transmission of information to a terminal selected from the subset of the terminals in a substantially random manner, wherein the transmit antenna assigned by the scheduling component corresponds to a transmit antenna index received via the feedback data from the terminal selected from the subset of the terminals.

2. The system of claim 1, wherein the transmit antenna is configured to transmit the information to the terminal via a receive antenna selected by the terminal from a plurality of available receive antennas.

3. The system of claim 1, wherein the scheduling component is further configured to receive the transmit antenna indices and one-bit quantized signal quality indications, including the defined one-bit quantized signal quality indication, from the terminals over a feedback channel.

4. The system of claim 3, wherein the one-bit quantized signals quality indications comprise one-bit quantized signal-to-interference-plus-noise ratios respectively corresponding to the terminals.

5. The system of claim 3, wherein the one-bit quantized maximum signal quality indication comprises a value of one highest of the quantized signal quality indications.

6. The system of claim 3, wherein the one-bit quantized signal quality indications comprise one-bit quantized values corresponding to maximum signal qualities achievable at the respective terminals.

7. The system of claim 6, wherein at least one of the one-bit quantized values is a 1-bit value having a value of 1 in response to a maximum signal quality achievable by a corresponding terminal satisfying a function of a defined threshold, or a value of 0 in response to the maximum signal quality achievable by the corresponding terminal failing to satisfy the function of the defined value.

8. A method, comprising:
    receiving transmit antenna index data and single bit quantized signal quality indicator data from a plurality of terminals;
    clustering the plurality of terminals into at least two groups respectively corresponding to at least two transmit antenna indices indicated by the transmit antenna index data;
    identifying a subset of terminals comprising a first group of the at least two groups that correspond to a highest single bit quantized signal quality indicator indicated by the single bit quantized signal quality indicator data; and
    scheduling a transmit antenna for transmission of information to a terminal selected from the subset of terminals in a substantially random manner, wherein the scheduling comprises selecting the transmit antenna corresponding to a transmit antenna index received from the terminal via the transmit antenna index data.

9. The method of claim 8, wherein the receiving the single bit quantized signal quality indicator data comprises receiving single bit quantized signal-to-interference-plus-noise ratio data.

10. The method of claim 8, further comprising transmitting information from the transmit antenna to the terminal via a receive antenna selected by the terminal.

11. The method of claim 8, wherein the receiving comprises receiving the transmit antenna index data and the single bit quantized signal quality indicator data over a feedback channel.

12. The method of claim 8, wherein the transmit antenna corresponds to a first transmit antenna index, of the at least two transmit antenna indices, corresponding to the first group.

13. The method of claim 8, wherein the receiving the single bit quantized signal quality indicator data from the plurality of terminals comprises receiving single bit quantized values corresponding to respective maximum achievable signal qualities for the plurality of terminals.

14. A system, comprising:
    means for determining transmit antenna indices and single bit quantized signal quality indicators provided by respective receivers;

means for grouping a subset of the receivers associated with a common transmit antenna index, of the transmit antenna indices, into a first set of receivers;

means for identifying a second set of receivers comprising a subset of the first set of receivers that are associated with a highest quantized signal quality indicator based on the single bit quantized signal quality indicators; and means for transmitting information to a receiver selected in a substantially random manner from the second set via a transmit antenna corresponding to the common transmit antenna index.

15. The system of claim 14, wherein the means for determining the transmit antenna indices and the single bit quantized signal quality indicators comprises means for determining single bit quantized signal-to-interference-plus-noise ratio indicators.

16. The system of claim 14, further comprising means for receiving the transmit antenna indices and single bit quantized signal quality indicators over a feedback channel.

17. The system of claim 14, wherein the single bit quantized signal quality indicators comprise single bit quantized values corresponding to maximum signal qualities achievable at the respective receivers.

18. A computer-readable storage device having stored thereon computer-executable instructions that, in response to execution, cause a computing system comprising a processor to perform operations, comprising:

receiving feedback data reporting transmit antenna indices and one-bit quantized signal quality indicators from respective terminals;

grouping the terminals into sets of terminals respectively corresponding to a same transmit antenna index of the transmit antenna indices;

for at least one set of the sets of terminals, selecting a terminal substantially randomly from a group of terminals comprising the set, wherein the group of terminals correspond to a defined highest one-bit quantized signal quality indicator based on the feedback data; and scheduling a transmit antenna corresponding to the same transmit antenna index for transmission of information to the selected terminal.

19. The computer-readable storage device of claim 18, wherein the receiving comprises receiving one-bit quantized signal-to-interference-plus-noise ratio values corresponding to the respective terminals.

20. The computer-readable storage device of claim 18, wherein the receiving comprises receiving one-bit quantized values representing maximum signal qualities achievable at the respective terminals.

* * * * *